Patented Aug. 14, 1934

1,970,303

UNITED STATES PATENT OFFICE 1,970,303

METHOD OF PURIFYING AMMONIUM THIOCYANATE

Wilhelm Gluud, Dortmund-Eving, Germany, assignor to Gesellschaft für Kohlentechnik m. b. H., Dortmund-Eving, Germany, a German company No Drawing. Application May 2, 1933, Serial No. 669,069. In Germany May 7, 1932

1 Claim. (Cl. 23—75)

My invention relates to improvements in a method of purifying ammonium thiocyanate.

In the industrial production of ammonium thiocyanate at coking plants the crude salt solution freed from the bulk of impurities, such as tar, is generally worked up by heating said solution, whereby thiosulphates, soluble ferrocyanides and the like are converted almost completely to insoluble substances which may be separated. Hereupon the solution is clarified by filtering, separating, settling etc. A hot concentrated mother liquor is obtained by evaporating, this liquor being allowed to crystallize. The salt so obtained is dissolved again in hot water and recrystallized. If need be, the crystallizing is repeated in the same manner.

This method is defective inasmuch as the ammonium thiocyanate obtained turns red on storing whereby its market-value is considerably depreciated. As I have found out, this discolouring is due to minimal traces of firmly adherent insoluble iron compounds. If the ammonium thiocyanate is then dissolved in hot water for the purpose of recrystallization, these iron compounds are decomposed by the acid action of the hot strong ammonium thiocyanate solution with the effect that said iron compounds turn again soluble, so that on working in a hot solution these impurities cannot be removed by any separating operation.

Recognizing these facts led me to give up the advantages of recrystallizing the crude salt from a hot solution and to dissolve it in cold water instead. The effect is surprising. On dissolving the salt in cold water, such as water of room temperature, the bothersome impurities remain undissolved and may be readily and entirely separated, so that after concentrating the filtered lye and allowing it to crystallize a salt results which is almost completely free from said iron containing impurities, and which may be stored without losing its pure white colour.

It may be mentioned that perhaps the contact of the salt with the air adds to oxidize ferrous compounds to ferric compounds, thus rendering them more easily separable.

I claim:—

In the method of refining ammonium thiocyanate obtained by heating crude ammonium thiocyanate solution, separating the insoluble impurities, evaporating the solution and allowing it to crystallize, the step which consists in redissolving the salt so obtained in cold water, filtering the solution, concentrating and cooling the filtrate, and allowing the filtrate to crystallize.

WILHELM GLUUD.